Figure 1:
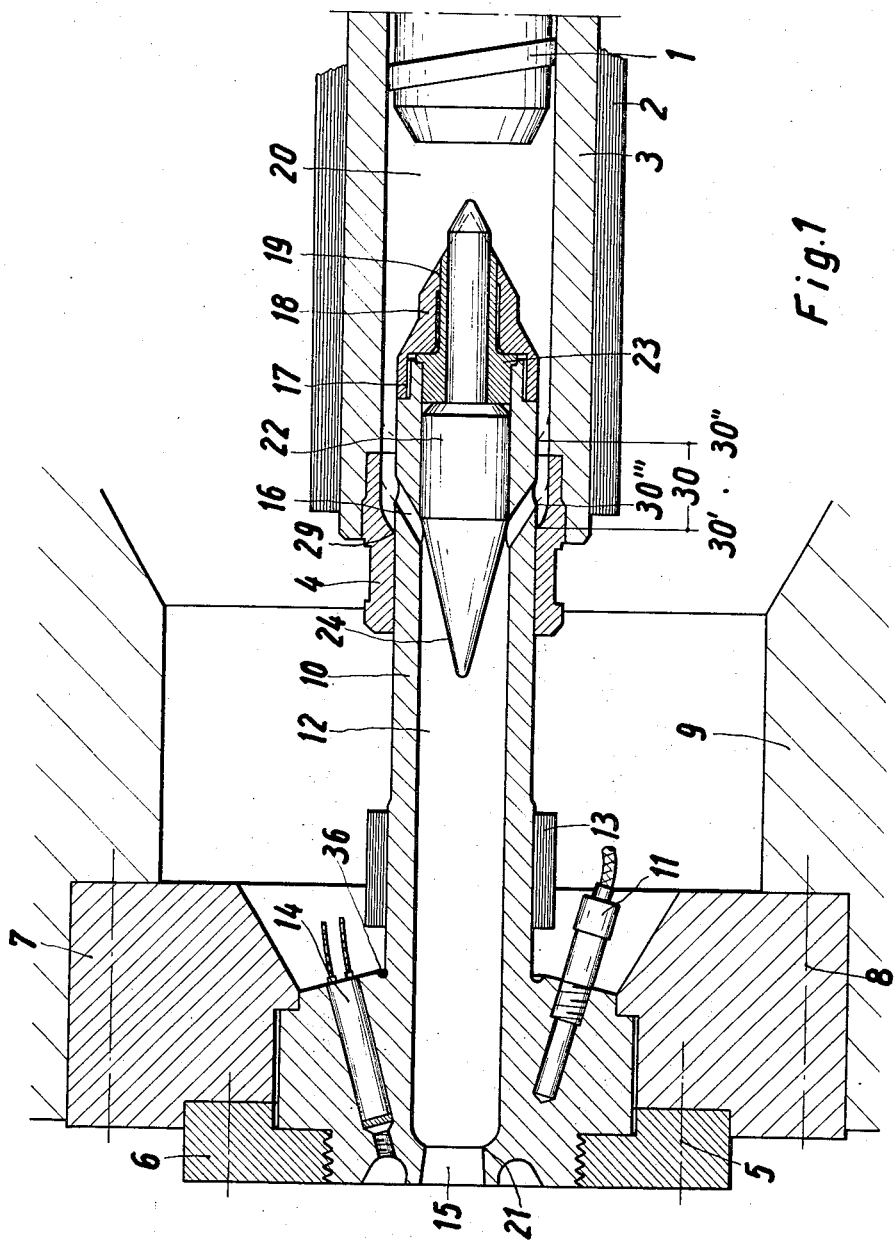

United States Patent [19]
Lohmann

[11] 3,807,925
[45] Apr. 30, 1974

[54] NOZZLE FOR INJECTION MOLDING

[75] Inventor: Albert Lohmann, Niederkruchten, Germany

[73] Assignee: Mannesmann-Meer Aktiengesellschaft, Monchengladbach, Germany

[22] Filed: Nov. 28, 1972

[21] Appl. No.: 309,998

[52] U.S. Cl. .................. 425/245 R, 425/DIG. 224
[51] Int. Cl. .............................................. B29f 1/03
[58] Field of Search.......... 425/245 R, 245 NS, 146, 425/DIG. 224, DIG. 225, DIG. 226, DIG. 227, DIG. 229

[56] References Cited
UNITED STATES PATENTS
3,671,162   6/1972   Lohmann ................ 425/245 R
3,095,609   7/1963   Lievre ...................... 425/245 R FOREIGN PATENTS OR APPLICATIONS
1,247,613   8/1967   Germany ..................... 425/245
911,184     11/1962  Great Britain ............... 425/245
682,756     8/1966   Belgium Primary Examiner—J. Spencer Overholser
Assistant Examiner—David S. Safran
Attorney, Agent, or Firm—Ralf H. Siegemund

[57] ABSTRACT

A nozzle unit for an injection molding machine with extruder screw and barrel terminating in a nozzle tube which may cover or uncover ducts in a sprue bushing on which the nozzle tube rides. The bushing is closed by a plug which may additionally serve as a valve for the mold end of the bushing.

5 Claims, 2 Drawing Figures

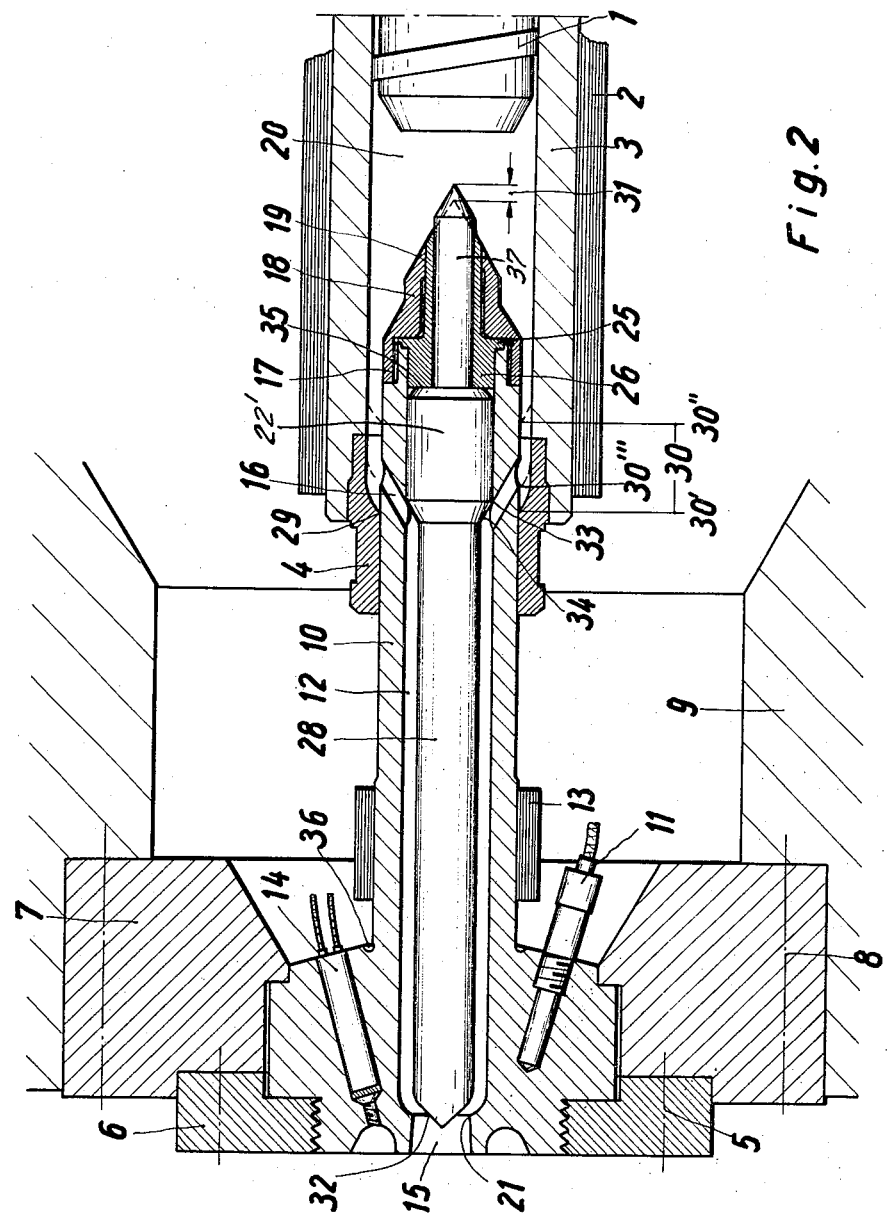

NOZZLE FOR INJECTION MOLDING

BACKGROUND OF THE INVENTION

The present invention relates to a nozzle unit for screw type extruders as they are used in injection molding machines for processing thermo-plastic material. More particularly, the invention relates to improvements in nozzles for injection molding machines wherein the nozzle is connected throughout an entire working cycle to the mold or a portion thereof and wherein the screw can be turned and is also axially displaceable in a cylinder serving as heatable, plasticizing chamber which terminates in a nozzle at the injection side. The plasticized material is injected into the closed mold by operation of axial displacement of the screw and as cooperating with the nozzle.

The injection of plastic material into a mold is usually carried out directly through the sprue and/or via heated runners and distributor ducts leading to individual sprues and mold cavities. Unfortunately, it was observed that upon opening the mold the content of the distributor channel and duct system decompresses and fills partially that part of the mold cavity which is directly connected and remains connected to the distributor system. As a consequence, the next cycle may produce injection mold parts which do not have uniform texture.

It has been suggested to avoid this problem by retracting the screw (i.e. the injection plunger) shortly before opening the mold for the particular distance, so that the resulting volume increase of the injector nozzle permits decompression of the plastic material in the distributor duct system. Alternatively, the distributor system is provided with a controlled, passage into which material in the distributor system may expand upon decompression.

The first method has the disadvantage that it requires to operate with a normally open nozzle. A valve needle when used to close the nozzle would close immediately upon such induced decompression. Furthermore, it is necessary to have the injection plunger, which is part of the screw, acting twice and that requires special operating means, and still the desired effect is not completely effective during retraction of the extrusion screw, because the non-return valve opens upon plunger and screw retraction. The other method has the disadvantage that the particular discharge path must be controlled extremely accurately and, in addition, there is some loss of material in each cycle.

DESCRIPTION OF THE INVENTION

It is an object of the present invention to provide improved construction in injection molding machines which avoids outflow of material after opening the die and mold due to decompression, and to prevent decompression of the material into the open mold particularly by means of an improved construction of the nozzle in the injection molding machine. The nozzle should also be suitable to process material of different characteristics of flowing. Therefore, it is an object of the present invention to provide improvements for injection molding machines having extruder screw, injection nozzle and mold. In accordance with the preferred embodiment of the present invention, it is suggested to provide a sprue bushing which extends in direction of an extruder barrel which receives the screw. The bushing is provided with lateral ducts and the barrel terminates in a nozzle tube which rides on the bushing. Depending upon the axial position of the nozzle, the ducts are either closed or open. Relative movement of the injector unit as composed of barrel, screw, and nozzle tube expands the effective volume in bushing and barrel, at open ducts, for decompression during retraction. Upon initial advance, the ducts remain closed briefly so that the content in the barrel is compressed and may discharge under high pressure upon opening of the ducts into the sprue. The sprue bushing is closed by a member which may additionally serve as closing valve from the sprue.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates a section view through a nozzle construction in accordance with the preferred embodiment of the present invention; and FIG. 2 is a section view through a modified version of the preferred embodiment of the present invention.

Turning now to the detailed description of the drawings and referring to features that are common to FIGS. 1 and 2, an extruder barrel 3 is shown to contain an extruder screw 1. The barrel and screw cooperate with a hopper or the like for gravity feed as is conventional for injection molding machines operating with extrusion for plasticizing the raw material. The screw 1 serves alternatively as injection ram. A heater ribbon or band 2 is provided on the barrel 3. A tubular nozzle element 4 is screwed into the end of barrel 3. The unit as established in that manner is axially movable and can be driven in a manner known per se.

A mold element 9 is provided with thrust rings 6 and 7 which are interconnected by means of bolts 5 and ring 6, is bolted to mold part 9 by means of bolts 8. The thrust ring 7 carries a sprue bushing 10. The injection unit, and here particularly, the nozzle element 4 can sealingly glide on tubular bushing 10. The bushing 10 is provided with thermo-elements 11 for monitoring melting temperatures inside of the chamber or cavity 12 of the bushing. Near this end, bushing 10 is provided with insulating edges 36, a band heater 13, as well as heating cartridges 14.

It can readily be seen that bushing 10 has configuration of a hollow cylinder defining a cylindrical chamber 12 accordingly. Near its end portion where facing the mold, chamber 12 terminates in a sprue runner 15 leading for example to other runners of a heated duct system. The portion of bushing 10 which is received by nozzle tube 4 is provided with several oblique, laterally extending ducts 16 beyond which bushing 10 terminates in an outer thread 17. A cap 18 with a coaxial bore 19 is screwed onto thread 17, and the bore receives a bearing element, 23 in FIG. 1, 26 in FIG. 2. A plug element (22 in FIG. 1, 22' in FIG. 2) with a rearwardly extending guide pin is received in that end of bushing 10; the guide pin extends into the bearing portion that is received in bore 19. The plug element is provided for separating a cavity 20 from cavity 12. The cavity 20 is essentially established by the ram end of the screw 1 inside of barrel 3, by the external end of bushing 10 as plugged by element 22 or 22', as well as by a small portion of the tubular nozzle 4.

The nozzle tube 4 has a first front portion having an internal diameter for sealingly riding on the outer surface of bushing 10 upon axial displacement. A second, rear portion of nozzle tube 4 has wider internal surface, its surface actually merging flush with the inner surface of barrel 20. The transition between the two inner portions of the nozzle tube 4 is defined by a control edge 29.

As stated, the injection unit as defined, e.g. by elements 1, 3 and 4 is permitted to move relative to bushing 10 so that the nozzle tube, when having position more to the right, closes ducts 16. Upon displacement to the left, control edge 29 passes over ducts 16 and opens them. Reference numeral 30 refers to the total stroke length, using the positions of control edge 29 as indicator. The injection unit is shown in maximum displacement position to the left (position 30' of the control edge 29). Upon retracting the injection unit, ducts 16 remain fully open as the control edge 29 moves from 30' to 30'''. Upon further retraction, the ducts are closed and remain closed as the control edge recedes to position 30''. The stroke length to 30'' determines the degree of compression in chamber 20 when the unit 1 to 4 advances and the ducts 16 are still closed.

FIG. 1 shows a specific plug element 22 which is affixed to bushing 10. For this, bearing 23 and cap 18 provide rigid connection and support. The bushing closing element 22 has a cylindrical portion as it extends into and sits in cavity 12 while, on the other hand, the conical configuration 24 with rounded apex and as projecting into chamber 12, provides favorable conditions as far as the flow of plastic through ducts 16 and into chamber 12 is concerned. This way, the nozzle unit has characteristics of an open nozzle with low flow resistance and control upon axial displacement of the injection unit.

Turning now to particulars of FIG. 2, there is illustrated a nozzle unit which is similar to a great extent to the unit shown in FIG. 1 except that the element for plugging bushing 10 has an added function. In this case, the sprue can be closed independently from the axial displacement of the injection unit and in dependence upon the pressure and filling conditions of the extruded and injected material to both sides of the ducts 16. The plug element of FIG. 2 has a body portion 22' which is similar to body 22 in FIG. 2 except for the cone 24. Also, the rearwardly extending pin of plug element 22' is permitted to ride in sleeve bearings 26 having collar 25 so that the plug element is axially displaceable.

The front of plug body 22' is extended in a pin 28 traversing chamber 12 and terminates in a valve cone 32 cooperating with a valve seat 21 as between sprue runner 15 and chamber 12. As plug 22' moves to the left for stroke length 31 while guided in bearing 26, the chamber 12 can be separated from sprue runner 15. Thus, chamber 12 can be effectively separated from the mold cavity by means of valve 32–21, while chamber 12 can be separated from chamber 20 as in FIG. 1.

A transition cone 34 is provided as between plug body 22' and pin 28, to act as pressure responsive surface of the valve pin 28. A control edge 33 to body 22' provides for control of the effective opening of ducts 16 from the inside of chamber 12 and in dependence upon the disposition of body 22'. However, when valve 32–21 is closed, ducts 16 are still partially open. The rear pin 37 pertaining to body 22' and being held in bearings 26 has its rear surface provided in conical configuration so as to be affected by the dynamic pressure in chamber 20.

The nozzle unit operates as follows. It is assumed that the injection unit has been retracted so that control edge 29 has disposition 30''. The ducts 16 are closed by the front portion of nozzle tube 4. Raw material is being plasticized by cooperation of the extruder screw 1 and the band heater 2. Now the unit is again advanced towards the left. The molten plastic material in chamber 20 is compressed for a very short period of time in chamber 20. Depending upon the incremental stroke length of injection unit advance from position 30'' of the control edge 29 up to the instant just prior to reaching the ducts 16, the material in chamber 20 will be more or less strongly compressed. Depending on the stroke length from position 30'' as well as on the plastic material, the compression may be (but does not have to be) sufficiently strong so that the compressed plastic almost explodes into chamber 12 as soon as ducts 16 are open. Concurrent advance of ram-screw 1 may aid in the compression. A slight retraction of the ram-screw can be used to control or to offset any undesired premature compression. In any event, as ducts 16 open the plastic material can flow into the chamber 12. The screw 1 begins axial displacement and acts as injection ram. The figures show the nozzle fully open and in terminal position wherein the control edge 29 has reached position 30', somewhat ahead of ducts 16.

As far as FIG. 1 is concerned, the plastic material as it passes through channel 16 enters cavity or chamber 12 and from there through open sprue runner 15 directly into the runners of the not illustrated, hot channel distributor system. The situation is somewhat different in FIG. 2. The initial pressure build up in chamber 20 prior to injection unit advance, acts on pin 37 of member 22' as exposed to the rear of bushing 10, and holds pin 28 forwardly displaced by stroke length 31. Accordingly, the pin 28 when in forward position causes valve cone 32 to close valve seat 21. This closing position does not directly affect the opening of nozzle ducts 16. However, the advanced position of plug body 22' covers partially, but not completely, the exit openings of channel 16. Therefore, as the injection unit advances and control edge 29 opens ducts 16, plastic material does enter the chamber 12 and fills the same gradually.

As chamber 12 fills with plastic, the exposed part of the cone 32, as well as the pressure in chamber 12 acting on the conical surface 34, actually acts on a larger surface area than the exposed surface of element 37 is being acted upon by the pressure in chamber 20; so that the valve closing force is overcome, and cone 32 of pin 28 is lifted off the sealing edge 21 until the pin assumes the position which is the one illustrated in FIG. 2 wherein particularly an abutment surface 35 of body 22' engages bearing 26. After valve 32 has opened, The ram-screw 1 may advance to fill the mold cavity.

It is also a characteristic feature of the invention that the injection unit is retracted soon after the mold cavity has been filled, and after injection pressure has been applied. The retraction must occur immediately prior to opening the mold and removing the molded object.

A complete retraction of the injection unit is, of course, needed for beginning another injection cycle plasticizing and additional raw material by the screw. However, the retraction must begin before opening the mold. The retraction will be considered in some detail as it controls particular events. As a partial or initial stroke (from 30' to 30''') is being traversed by the receding elements 1 to 4, the control edge 29 of the nozzle part 4 does not cover and close the ducts 16; chamber 12 remains conductively connected to chamber 20. This partial stroke of retraction effectively enlarges the volume of chamber 20 and is sufficient to decompress the still highly pressurized material lodged in the distributor channel, as well as in the interior of chamber 12 and in chamber 20 due to the open communication through ducts 16. This decompression suffices so that upon opening the mold and removing the molded parts, molten material will not be forced into the open mold.

The pressure relief operation as resulting from the initial increase of the available volume is not interferred with by the valves 32–29 in FIG. 2. The pin 28 remains retracted as pressure in chamber 20 is not higher than in chamber 12. Upon further retraction of the nozzle unit, ducts 16 are covered and closed to separate the chambers 12 and 20 from each other. In FIG. 2, pin 28 will return so that its cone 32 re-engages seat 29 whenever, for example, the new extrusion flow in chamber 20 causes exposed pin 37 to advance for stroke length 31.

Therefore, it can be seen that the nozzle unit as explained and described has been developed so as to permit simple control action for decompressing molten material after an injection shot and which is still inside of the distributor system, sprue and nozzle. It can also be seen that the various types of material and working methods may readily be adapted to this particular construction of the nozzle. For example, if the thermoplastic material is to be foamed, the material will be compressed to the maximum possible injection pressure when the injection and extrusion unit advances, and the thusly precompressed material is then rapidly injected into the various channels, through rapid opening of the connecting channels. This way, one can make large surface area parts without flaws.

The invention is not limited to the embodiments described above but all changes and modifications thereof not constituting departures from the spirit and scope of the invention are intended to be included.

I claim:

1. In an injection molding machine with extruder screw, injection nozzle and mold, the improvement comprising:
 a sprue bushing having lateral ducts, the one end of the bushing facing the screw being provided with bearing means; the other end of the bushing facing the mold;
 a closing member for the bushing having a portion received by the bearing means;
 axial displaceable injection means including the screw, an extruder barrel with heater bands and nozzle tube on the barrel, receiving the bushing so that the nozzle tube sealingly rides on the bushing upon axial displacement of the injection means, the closing member having a surface portion projecting through the bearing means and being exposed to the interior of the barrel, but separating the interior of the barrel from the interior of the bushing;
 the nozzle tube having first internal dimensions for sealingly riding on the bushing and second internal dimensions wider than the first dimensions, there being a control edge between the portions of the tube having the first and second dimensions, for opening and closing the lateral ducts depending on the relative axial position of the nozzle means, the control edge having a relative axial position such that upon retraction of the injection means the lateral ducts remain open for a particular stroke length of retraction so that the interior of the bushing may decompress into the barrel, through the ducts and the nozzle tube portions of second dimensions, while the ducts are being closed by the control edge and by the nozzle tube portions of first dimensions upon further retraction of the injection means.

2. The improvement as in claim 1, the closing member being axially slidingly disposed in the bearing and carrying a pin with valve cone, the sprue bushing having a valve seat at its other end, there being a control edge between the pin and the member for controlling flow of plastic through the ducts and from the inside of the bushing.

3. The improvement as in claim 1, the closing member being fixed in the bearing and having a conical portion projecting into the interior of the bushing and providing smooth flow path continuation for plastic flowing through the duct.

4. The improvement as in claim 1, the injection unit constructed to provide compression of plastic in the barrel upon advance and until the nozzle tube opens the ducts to obtain high pressure discharge of the compressed plastic into the bushing.

5. The improvement as in claim 2, the closing member projecting into the barrel and being subjected to dynamic pressure in the barrel for operating the closing member for valve closing, the closing member constructed to open the valve as the bushing fills with material through the ducts.

* * * * *